(12) United States Patent
Huang et al.

(10) Patent No.: US 11,320,122 B2
(45) Date of Patent: May 3, 2022

(54) SUSPENSION WIRE STRUCTURE AND LIGHTING DEVICE

(71) Applicants: RADIANT OPTO-ELECTRONICS (SUZHOU) CO., LTD., Jiangsu (CN); Radiant Opto-Electronics Corporation, Kaohsiung (CN)

(72) Inventors: Guo-Hao Huang, Kaohsiung (TW); Shang-Chia Liu, Kaohsiung (TW); Chun-Yi Sun, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/159,888

(22) Filed: Jan. 27, 2021

(65) Prior Publication Data

US 2021/0199271 A1    Jul. 1, 2021

Related U.S. Application Data

(63) Continuation of application No. PCT/CN2019/130518, filed on Dec. 31, 2019.

(51) Int. Cl.
*F21V 21/008* (2006.01)
*F21V 23/06* (2006.01)
(Continued)

(52) U.S. Cl.
CPC .......... *F21V 21/008* (2013.01); *D07B 1/0693* (2013.01); *D07B 1/16* (2013.01);
(Continued)

(58) Field of Classification Search
CPC ........ F21V 21/008; F21V 23/06; F21V 21/16; D07B 1/0693; F16M 13/027; F21Y 2113/10; F21S 8/068; H01B 5/08
See application file for complete search history.

(56) References Cited

U.S. PATENT DOCUMENTS 3,834,149 A * 9/1974 Nisbet .................. D07B 1/0693
57/213
5,862,030 A * 1/1999 Watkins, Jr ............ H02H 5/043
361/103

(Continued)

FOREIGN PATENT DOCUMENTS

CN         101556839 A    10/2009
CN         102741942 A    10/2012
(Continued)

*Primary Examiner* — Peggy A Neils
(74) *Attorney, Agent, or Firm* — Muncy, Geissler, Olds & Lowe, P.C.

(57) ABSTRACT

A suspension wire structure comprises a conductive wire, a plurality of supporting stranded wires and a protective layer. The conductive wire has a first strand made of a first material. The plurality of supporting stranded wires surround the conductive wire, and each of the supporting stranded wires has a plurality of supporting strands made of a second material. The protective layer covers the surface of the conductive wire and is located between the conductive wire and the plurality of supporting stranded wires. The plurality of supporting stranded wires and the protective layer are conductive, and the protective layer is made of a third material. The first material, the second material and the third material are different from each other.

12 Claims, 10 Drawing Sheets

(51) Int. Cl.
*D07B 1/16* (2006.01)
*D07B 1/06* (2006.01)
*F16M 13/02* (2006.01)
*F21Y 113/10* (2016.01)

(52) U.S. Cl.
CPC .......... *F16M 13/027* (2013.01); *F21V 23/06* (2013.01); *F21Y 2113/10* (2016.08)

(56) References Cited

U.S. PATENT DOCUMENTS

| | | | |
|---|---|---|---|
| 7,335,836 B2 * | 2/2008 | Arakawa | F21S 8/06 174/36 |
| 8,403,519 B2 * | 3/2013 | Napier | F21V 21/008 362/184 |
| 2001/0017219 A1 | 8/2001 | Kijuchi et al. | |
| 2015/0206622 A1 * | 7/2015 | Murata | A61M 25/09 174/128.1 |
| 2020/0362512 A1 * | 11/2020 | Sahiner | D07B 1/0693 |

FOREIGN PATENT DOCUMENTS

| | | | | |
|---|---|---|---|---|
| CN | 105244071 A | | 1/2016 | |
| CN | 205956952 U | | 2/2017 | |
| CN | 206116089 U | | 4/2017 | |
| CN | 207558452 U | | 6/2018 | |
| CN | 207818221 U | | 9/2018 | |
| CN | 209859662 U | | 12/2019 | |
| EP | 3364422 | * | 8/2018 | .............. H01B 1/02 |
| TW | 201131589 A | | 9/2011 | |

\* cited by examiner

SUSPENSION WIRE STRUCTURE AND LIGHTING DEVICE

RELATED APPLICATIONS

This application is a continuation application of International Application No. PCT/CN2019/130518, filed on Dec. 31, 2019, which is incorporated herein by reference.

BACKGROUND OF THE INVENTION

1. Field of the Invention

The present invention relates to a suspension wire structure and a lighting device, and in particular, to a lighting device using suspension wires for electrical conduction.

2. Description of the Prior Art

Lighting devices are essential for human life. In general, lighting devices could categorize into two types, one is mounted lighting devices fixed to the ceiling, another is suspension lighting devices that are hung from the ceiling. The suspension lighting devices include multiple suspension wires to connect to a power source and a light-emitting object (such as a bulb) from the ceiling, and the power source transmits power to the light-emitting object via the multiple suspension wires. However, since the multiple suspension wires are exposed to air, oxidation will unavoidably occur and result in a short lifespan.

Therefore, it is desirable to improve the lifespan of the lighting devices.

SUMMARY OF THE INVENTION

To address the deficiencies of conventional products, an embodiment of the invention provides a lighting device.

The suspension wire structure comprises a conductive wire, a plurality of supporting stranded wires, and a protective layer. The conductive wire has a first strand made of a first material. The plurality of supporting stranded wires surround the conductive wire, and each of the supporting stranded wires has a plurality of supporting strands made of a second material. The protective layer covers the surface of the conductive wire and is located between the conductive wire and the plurality of supporting stranded wires. The plurality of supporting stranded wires and the protective layer are conductive. The protective layer is made of a third material, and the first material, the second material and the third material are different from each other.

In some embodiments, the plurality of supporting stranded wires abut against the periphery of the protective layer.

In some embodiments, there is no gap between the protective layer and the plurality of supporting stranded wires.

In some embodiments, a conductive adhesive is included between the protective layer and the plurality of supporting stranded wires.

In some embodiments, each of the plurality supporting stranded wire further has a conductive strand. The plurality of supporting strands surround the conductive strand, and the conductive strand is made of the first material.

In some embodiments, the suspension wire structure further includes a plurality of cores which abut against the protective layer and at least one supporting stranded wire.

In some embodiments, the suspension wire structure further includes a plurality of supporting conductive wires which abut against the protective layer and at least one supporting stranded wire.

In some embodiments, the conductive wire further has a plurality of second strands, the plurality of second strands surround the first strand, and the plurality of second strands are made of another material different from the first material.

In some embodiments, the conductive wire is electrically connected to the plurality of supporting stranded wires via the protective layer, and the plurality of supporting stranded wires are located at the outermost layer.

In some embodiments, the third material is an oxidized material.

A lighting device comprises a base, a power supply module, a lighting module, and at least two suspension wire structures. The base is fixed to a ceiling. The lighting module has at least one first light-emitting element. The power supply module is connected to an external power source and electrically connected to the lighting module. The suspension wire structures form at least one loop between the power supply module and the lighting module.

In some embodiments, the lighting module further includes a conductive fixing base. One end of the conductive fixing base is electrically connected to the suspension wire structure, and the other end of the conductive fixing base is electrically connected to a conductive sheet. The conductive sheet is electrically connected to at least one first light-emitting element, so that at least one first light-emitting element is electrically connected to the power supply module via the suspension wire structure. An electrical contact is created between the plurality of supporting stranded wires located at the outermost layer of the suspension wire structure and the conductive fixing base.

In some embodiments, the lighting device includes three suspension wire structures and at least one second light-emitting element. The first and the second of the suspension wire structures are electrically connected to at least one first light-emitting element to form a first set of loops. The first and third of the suspension wire structures are electrically connected to at least one second light-emitting element to form a second set of loops. At least one first light-emitting element has a color temperature different from at least one second light-emitting element.

A suspension wire structure (such as a first suspension wire structure) comprises a conductive wire and a plurality of supporting stranded wires. The conductive wire can be covered by a protective layer, and the protective layer is made of oxidized materials or materials that are not easily oxidized to prevent the conductive wire from oxidation. The plurality of supporting stranded wires surround the conductive wire and abut against the periphery of the protective layer. The plurality of supporting stranded wires and the protective layer can prevent the conductive wire from being exposed to the external environment, so that the oxidation probability of the conductive wire can be further reduced.

BRIEF DESCRIPTION OF THE DRAWINGS

The invention can be more fully understood by reading the following detailed description of the embodiment, with reference made to the accompanying drawings as follows. It should be noted that, in accordance with industry standard practices, the components are not drawn to scale and are used for illustrative purposes only. In fact, for the sake of clarity, the dimension of components may be arbitrarily shown.

DETAILED DESCRIPTION OF THE PREFERRED EMBODIMENTS

Figure 1:
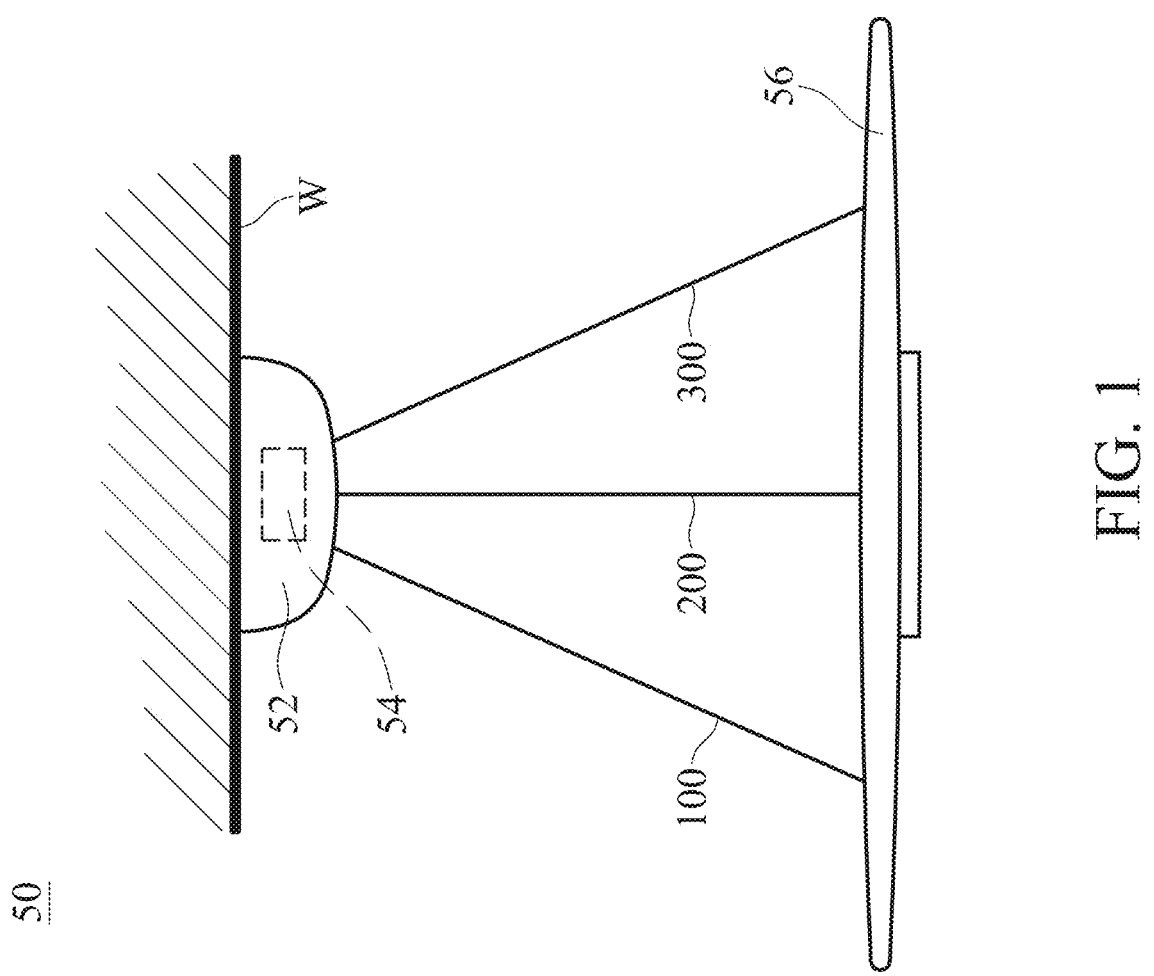
FIG. 1 is a schematic structural diagram showing a lighting device in accordance with an embodiment of this invention.

A preferred embodiment of the invention will be introduced with reference to appended figures as follows to demonstrate that the invention may be implemented. The configuration of each component in the specific embodiments discussed are merely for illustrative purpose, and do not limit the scope of the invention. The repetition of the reference numerals in the appended figures is for simplifying the explanation, and does not indicate the correlation between different embodiments. Direction terms mentioned by the invention, for example "upper", "lower", "left", "right", "front", "rear", etc. are merely directions in the appended figures for only explaining and illustrating the invention but not to limit the protection scope of the invention.

The ordinal numbers in the invention, for example "first", "second", "third", etc. do not have a sequential relationship, and they are only used to distinguish two different components with the same name.

In addition, the relative terms, such as "lower" or "bottom" and "higher" or "top" may be used in the invention to describe the relative relationship of one component to another component in the appended figures. It can be understood that if the illustrated device is turned upside down, the components described on the "lower" side will become the components on the "higher" side.

The terms "about" and "approximately" usually indicate within 20% of a given value or range, preferably within 10%, and more preferably within 5%. The quantity given here is, in general, which means that the meaning of "about" and "approximately" can still be implied without specific explanations.

Referring to FIG. 1, which is a schematic structural diagram showing a lighting device 50 in accordance with an embodiment of this invention. In this embodiment, the lighting device 50 includes a base 52, a power supply module 54, a lighting module 56 and three suspension wire structures. The base 52 is fixed on a predetermined location, such as a ceiling W, or other locations where the lighting device can be suspended. The power supply module 54 provides direct current (DC) power to the lighting module 56. Therefore, if the lighting device 50 uses an external power source like mains electricity, since mains electricity is alternating-current (AC) power, a transformer is required for the power supply module 54 to convert the AC into DC. If the power supply module 54 uses battery power, DC power can be directly provided without a transformer. The lighting module 56 has at least one light-emitting element to emit light. At least two of the three suspension wire structures in this invention can be connected between the power supply module 54 and the lighting module 56 to form a loop. In addition, the power supply module 54 can be optionally installed in the base 52 or the ceiling W, which do not limit the scope of the invention.

In this embodiment, the lighting device 50 includes a first suspension wire structure 100, a second suspension wire structure 200, and a third suspension wire structure 300, which are connected between the base 52 and the lighting module 56 for hanging the lighting module 56. Furthermore, a loop is formed by at least two of the suspension wire structures 100, 200, and 300, by which the power supply module 54 provides power to at least one light-emitting element in the lighting module 56.

Figure 2A:
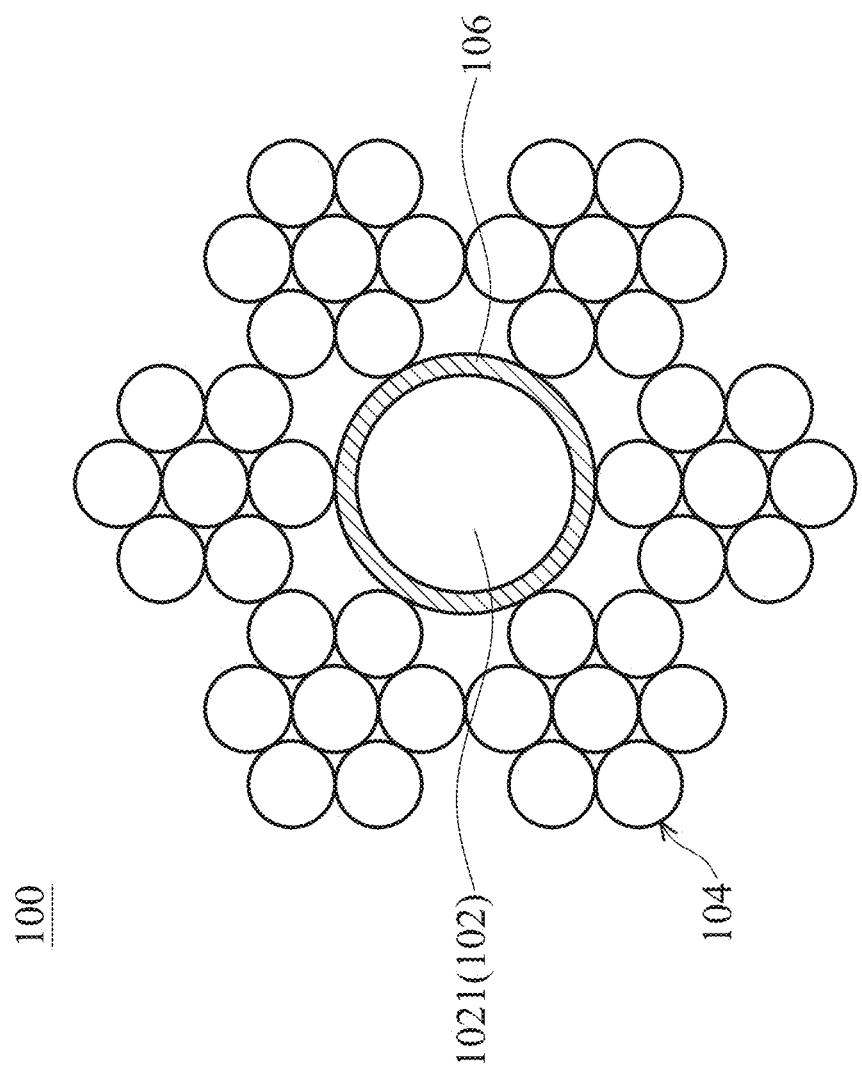
FIG. 2A is a schematic cross-sectional view showing a first suspension wire structure in accordance with an embodiment of this invention.
Figure 2B:
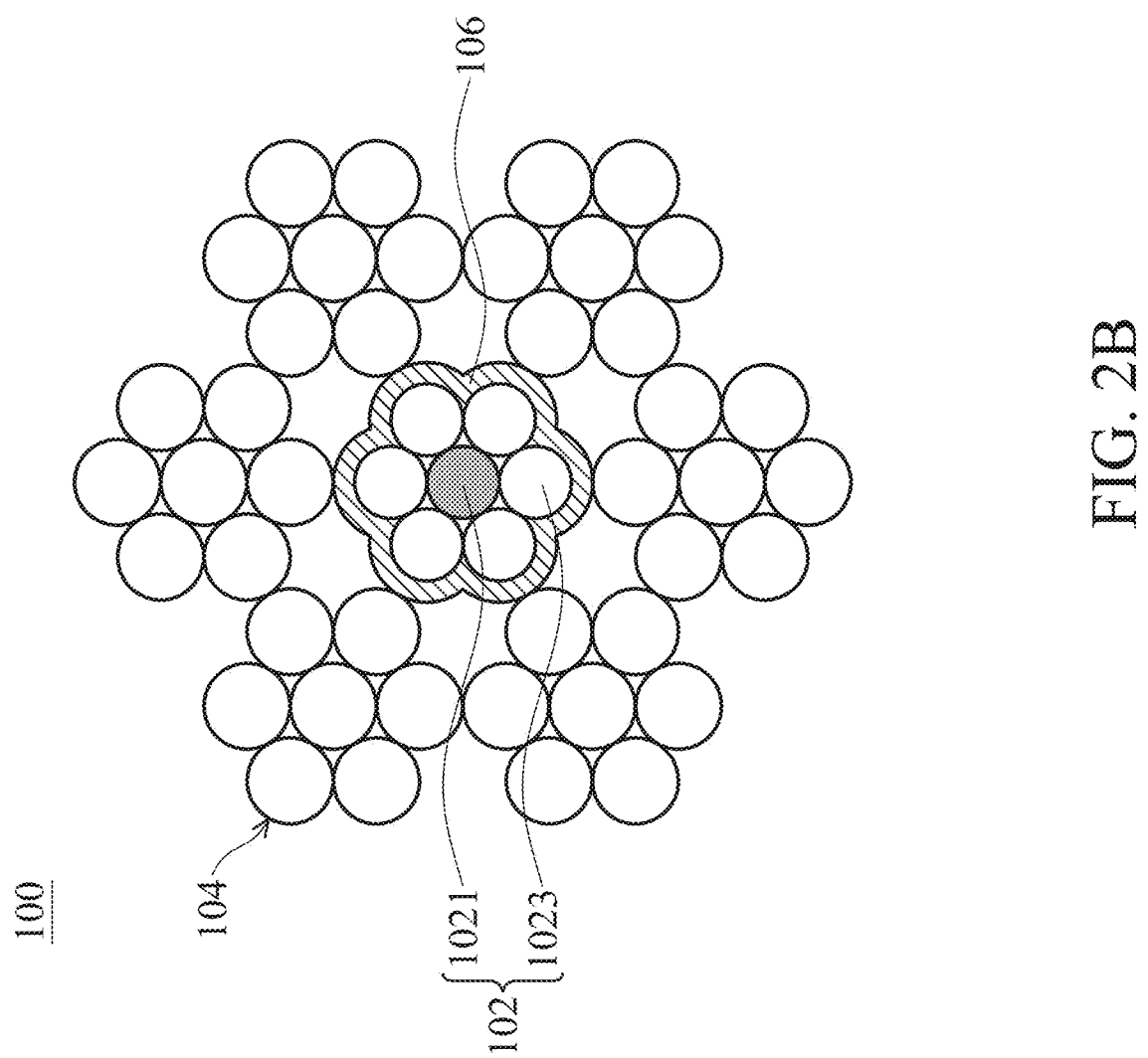
FIG. 2B is a schematic cross-sectional view showing the first suspension wire structure in accordance with another embodiment of this invention.

Referring to FIGS. 2A and 2B, FIG. 2A is a schematic cross-sectional view showing a first suspension wire structure 100 in accordance with an embodiment of this invention. The suspension wire structure 100 comprises a conductive wire 102, a plurality of supporting stranded wires 104, and a protective layer 106. In this embodiment, the conductive wire 102 is a solid cylinder, and is not formed by winding multiple copper wires. The conductive wire of this invention can also be presented in other ways as described in other embodiments of this invention. In other words, in this embodiment, the conductive wire 102 as shown in FIG. 2A is a single first strand 1021, and the first strand 1021 may be made of a first material, such as copper or copper alloy. Accordingly, the conductive wire 102 of this invention has a higher conductive performance, and at the same time can provide a higher supporting force. FIG. 2B is a schematic cross-sectional view showing the first suspension wire structure 100 in accordance with another embodiment of this invention. The solid conductive wire 102 in the aforementioned first suspension wire structure 100 may also include a first strand 1021 and a plurality of second strands 1023. The first strand 1021 is made of a first material. The plurality of second strands 1023 surround the first strand 1021, and the plurality of second strands 1023 are made of another material different from the first material, such as a second material. The first material may be copper or copper alloy, and the second material may be stainless steel, which do not limit the scope of the invention.

The plurality of supporting stranded wires 104 surround the conductive wire 102, and the plurality of supporting stranded wires 104 are made of the second material. The protective layer 106 covers the surface of the conductive wire 102 and is located between the conductive wire 102 and the plurality of supporting stranded wires 104. The plurality of supporting stranded wires 104 and the protective layer 106 are conductive, and the protective layer 106 can be made of a third material. The first material, the second material and the third material are different from each other.

For example, the oxidation activity of the third material is less than the one of the first material. The third material is not easily oxidized, so that the oxidation is not easily to occur in the protective layer 106. Therefore, the protective layer 106 can protect and prevent the conductive wire 102 from oxidation.

Furthermore, in some embodiments, the second material may be stainless steel, and the third material may be tin dioxide. Since tin dioxide is an oxidized material, it will not be oxidized again. Therefore, the protective layer 106 can protect and prevent the conductive wire 102 from oxidation.

In addition, as shown in FIG. 2, the conductive wire 102, the protective layer 106, and the plurality of supporting stranded wires 104 of the suspension wire structure 100 are arranged in an order from inside to outside. The plurality of supporting stranded wires 104 abut against the periphery of the protective layer 106, so that the plurality of supporting stranded wires 104 surround the conductive wire 102 and the protective layer 106. The conductive wires 102 and the protective layer 106 is prevented from being exposed to the external environment, so that the oxidation probability of the conductive wire 102 can be further reduced.

With the aforementioned design, the suspension wire structure disclosed in this embodiment does not have an insulating layer, and the conductive wire, supporting stranded wires, and protective layer are all made of metal materials. Therefore, the current transmitted by the conductive wire located at the core of the suspension wire structure can be conducted to the plurality of supporting stranded wires located at the outermost layer, and will not be shielded by the protective layer. In such way, even the plurality of supporting stranded wires located at the outermost layer of the suspension wire structure can be also electrified.

Figure 3:
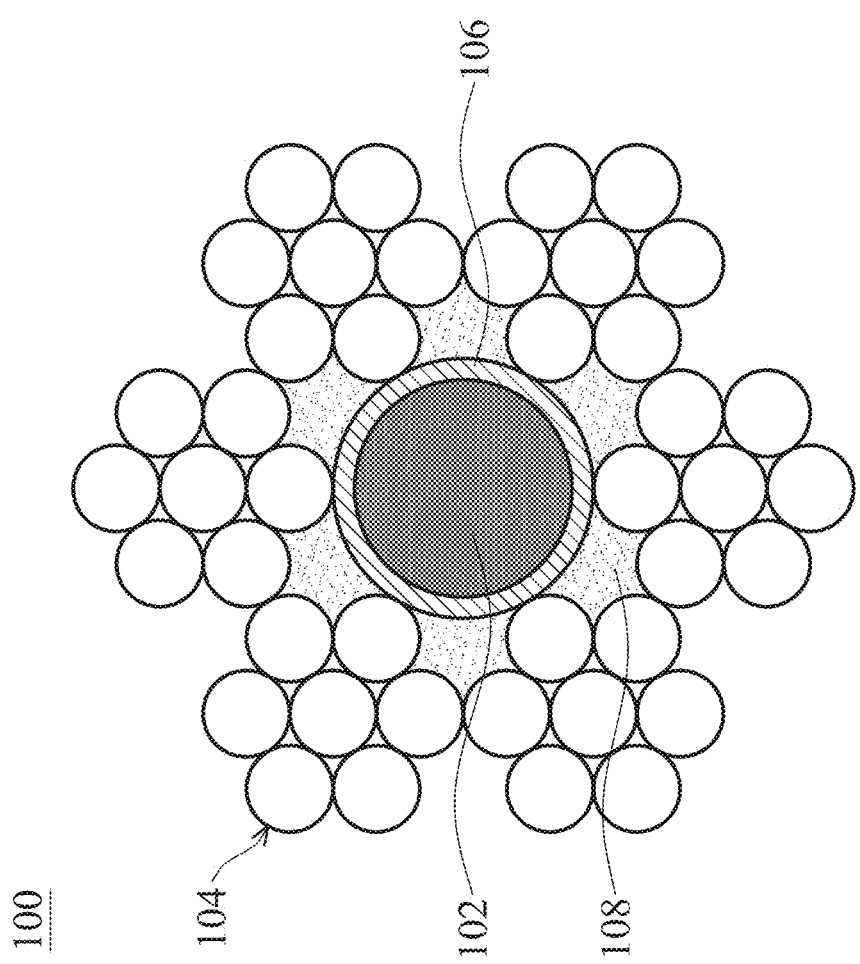
FIG. 3 is a schematic cross-sectional view showing the first suspension wire structure in accordance with another embodiment of this invention.

Referring to FIG. 3, which is a schematic cross-sectional view showing the first suspension wire structure 100 in accordance with another embodiment of this invention. In this embodiment, a conductive adhesive 108 is provided between the plurality of supporting stranded wires 104 and the protective layer 106. The conductive wire 102 can be electrically connected to the plurality of supporting stranded wires 104 via the protective layer 106 and the conductive adhesive 108. The conductive adhesive 108 can improve the tightness between the plurality of supporting stranded wires 104 and the protective layer 106. Therefore, the oxidation probability of the conductive wire 102 can be reduced, and at the same time high-efficiency conductivity can be ensured.

Figure 4:
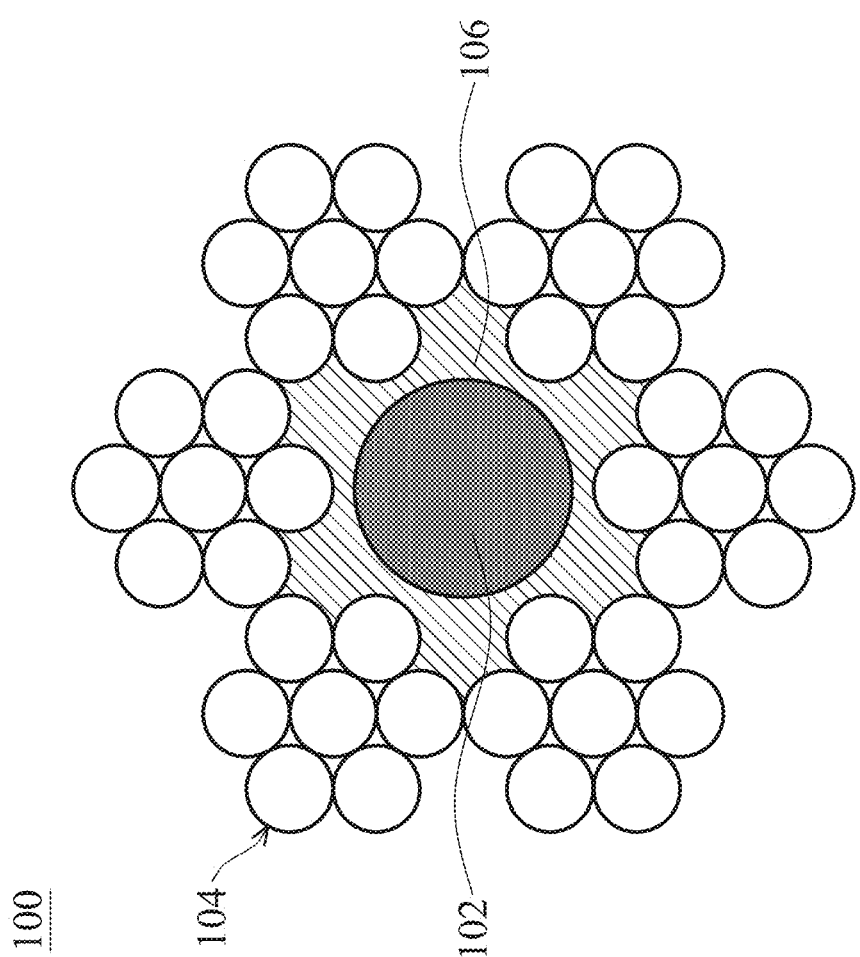
FIG. 4 is a schematic cross-sectional view showing the first suspension wire structure in accordance with another embodiment of this invention.

Referring to FIG. 4, which is a schematic cross-sectional view showing the first suspension wire structure 100 in accordance with another embodiment of this invention. In this embodiment, a protective layer 106 is provided between the plurality of supporting stranded wires 104 and the conductive wire 102. Since there is no gap between the protective layer 106 and the plurality of supporting stranded wires 104, the oxidation probability of the conductive wire 102 can be further reduced. In addition, the protective layer 106 in this embodiment can also be replaced by a conductive adhesive 108.

Figure 5:
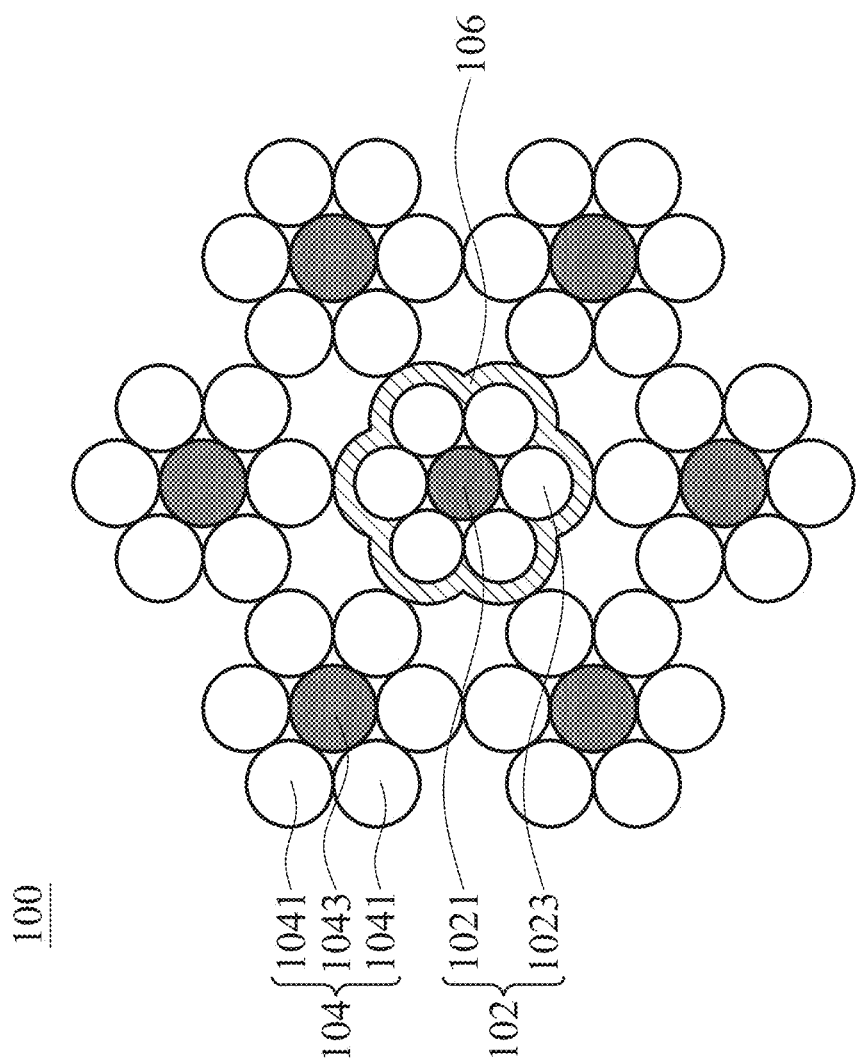
FIG. 5 is a schematic cross-sectional view showing the first suspension wire structure in accordance with another embodiment of this invention.

Referring to FIG. 5, which is a schematic cross-sectional view showing the first suspension wire structure 100 in accordance with another embodiment of this invention. In this embodiment, each of the plurality of supporting stranded wires 104 may include a plurality of supporting strands 1041 and a conductive strand 1043. The plurality of supporting strands 1041 surround the conductive strand 1043, and the plurality of supporting strands 1041 may be made of the second material. The conductive strand 1043 may be made of the first material (copper or copper alloy). In addition, in this embodiment, the conductive wire 102 may include a first strand 1021 and a plurality of second strands 1023. The first strand 1021 is made of the first material. These plurality of second strands 1023 surround the first strand 1021, and the plurality of second strands 1023 are made of another material different from the first material, such as the second material.

Due to the configuration of the conductive strand 1043 and the plurality of supporting strands 1041 in the plurality of supporting stranded wires 104, the oxidation probability of the conductive wire 102 can be reduced, and the conductive efficiency of the first suspension wire structure 100 can be improved. It should be noted that the configuration of the conductive wire 102 and the plurality of supporting stranded wires 104 of this embodiment can also be implemented in other embodiments of this invention. For example, the conductive wire 102 as shown in FIG. 3 can be implemented by the configuration of the conductive wire 102 as shown in FIG. 5, or the plurality of supporting stranded wires 104 as shown in FIG. 3 can be implemented by the configuration of the plurality of supporting stranded wires 104 as shown in FIG. 5.

In addition, in this embodiment, the conductive adhesive 108 can also be filled between the plurality of supporting stranded wires 104 and the conductive wire 102 or between the plurality of supporting stranded wires 104 and the protective layer 106, so that the tightness between the plurality of supporting stranded wires 104 and the protective layer 106 can be improved. Therefore, the oxidation probability of the conductive wire 102 can be reduced, and high-efficiency conductivity can be ensured.

Figure 6:
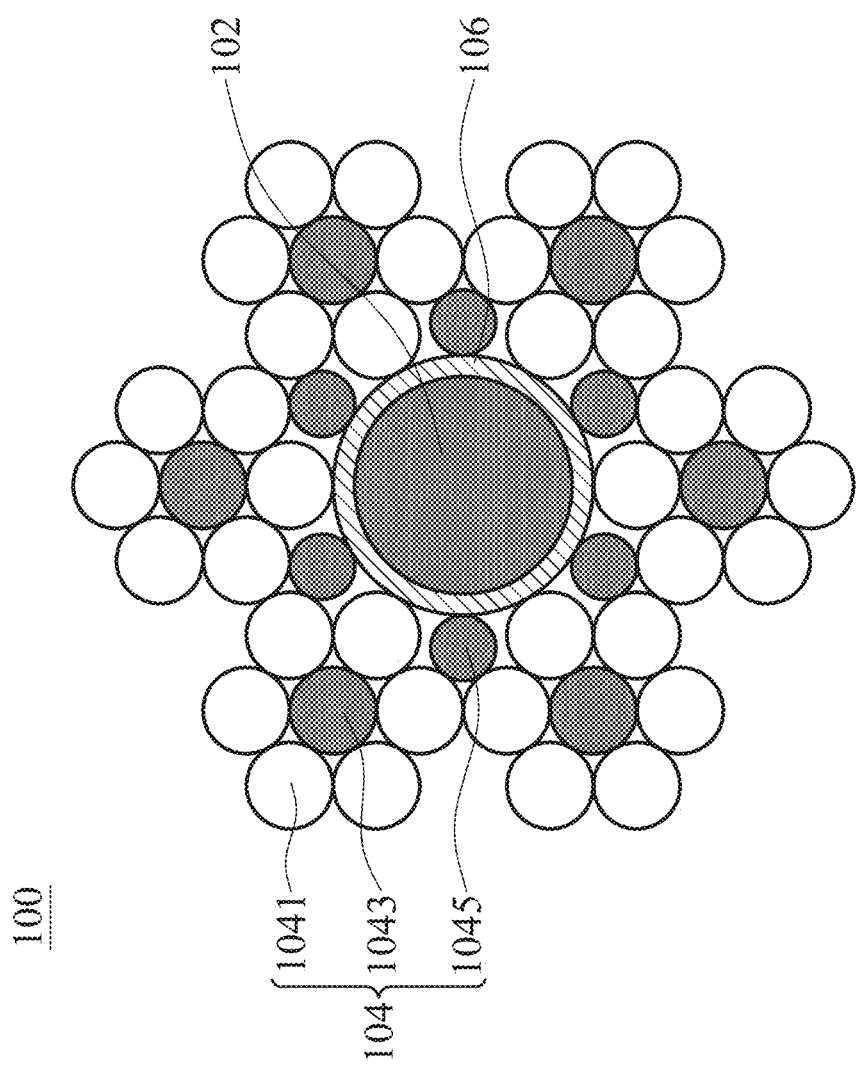
FIG. 6 is a schematic cross-sectional view showing the first suspension wire structure in accordance with another embodiment of this invention.

Referring to FIG. 6, which is a schematic cross-sectional view showing the first suspension wire structure 100 in accordance with another embodiment of this invention. In this embodiment, the first suspension wire structure 100 may further include a plurality of cores 1045 located between the protective layer 106 and the plurality of supporting stranded wires 104. The plurality of cores 1045 abut against the protective layer 106 and at least one supporting stranded wires 104. Due to the configuration of the conductive strand 1043 and the plurality of cores 1045, the oxidation probability of the conductive wire 102 can be reduced, and the conductive efficiency of the first suspension wire structure 100 can be further improved.

Figure 7:
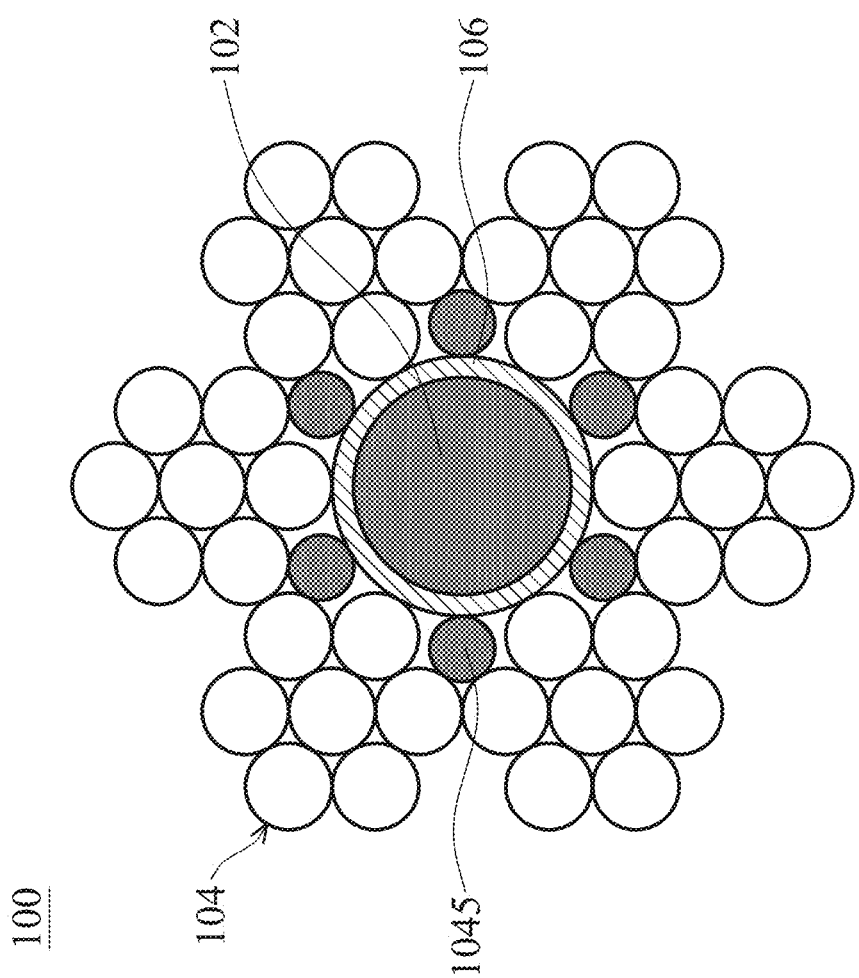
FIG. 7 is a schematic cross-sectional view showing the first suspension wire structure in accordance with another embodiment of this invention.

Referring to FIG. 7, which is a schematic cross-sectional view showing the first suspension wire structure 100 in accordance with another embodiment of this invention. In this embodiment, the first suspension wire structure 100 may include a plurality of cores 1045 which abut against the protective layer 106 and at least one supporting stranded wires 104. In addition, in this embodiment, the conductive adhesive 108 can also be filled between the plurality of supporting stranded wires 104, the plurality of cores 1045 and the protective layer 106. Furthermore, it should be noted that in the aforementioned embodiments, the second suspension wire structure 200 and the third suspension wire structure 300 may have the same structure as the first suspension wire structure 100. In addition, the configuration that a plurality of cores 1045 are arranged in the first suspension wire structure 100 can also be applied to other embodiments of this invention.

Figure 8:
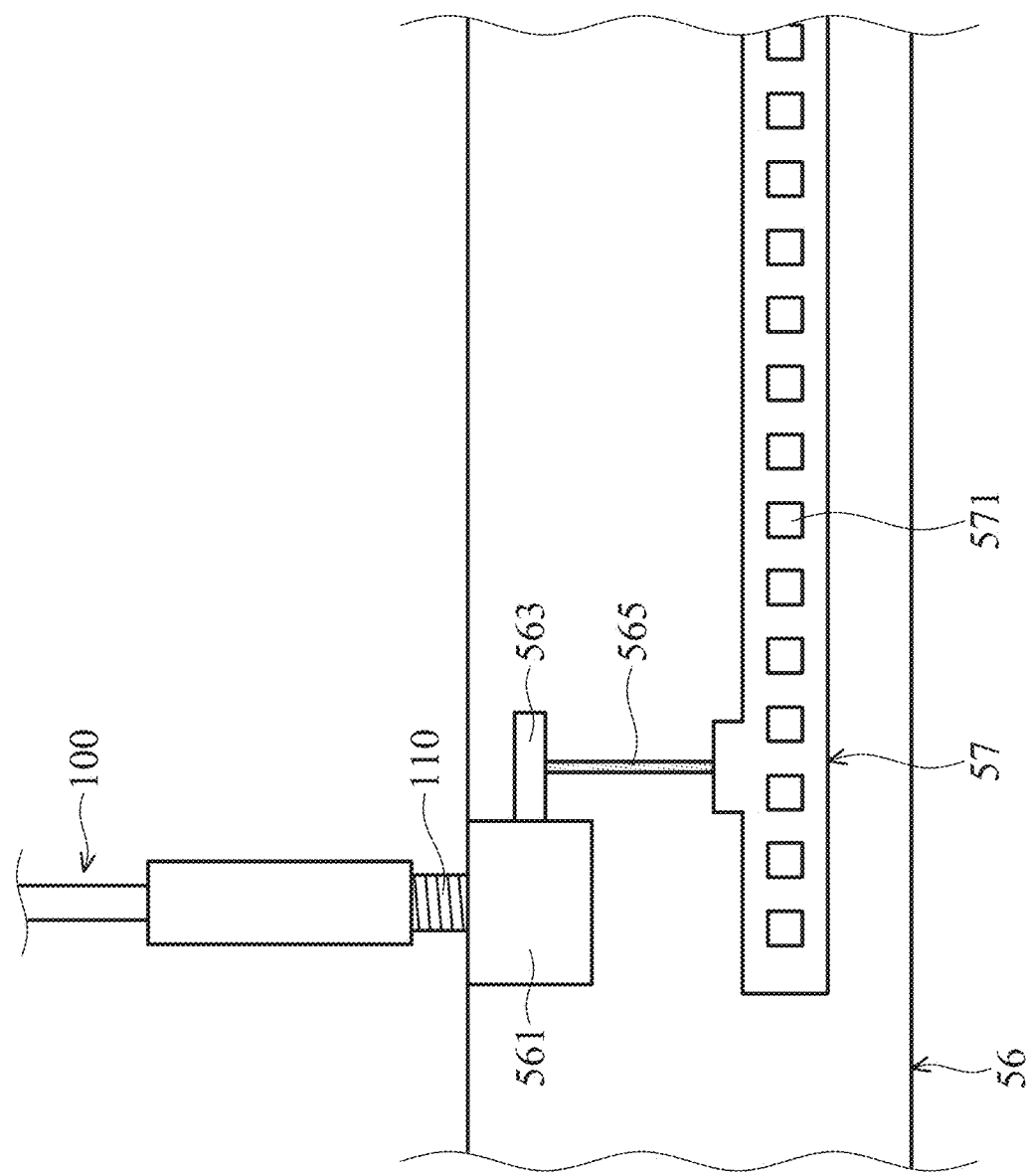
FIG. 8 is a schematic partial structural diagram showing the first suspension wire structure and a lighting module in accordance with an embodiment of this invention.

Referring to FIG. 8, which is a schematic partial structural diagram showing the first suspension wire structure 100 and the lighting module 56 in accordance with an embodiment of this invention. As shown in FIG. 8, the lighting module 56 further includes a conductive fixing base 561. One end of the conductive fixing base 561 is electrically connected to the first suspension wire structure 100. For example, the first suspension wire structure 100 further includes a screw connector 110 screwed into a screw hole (not shown) of the conductive fixing base 561. The other end of the conductive fixing base 561 is electrically connected to a conductive sheet 563, and the conductive sheet 563 is electrically connected to a light-emitting module 57 via a wire 565. The light-emitting module 57 includes at least one first light-emitting element 571. Referring to FIG. 2, since the first suspension wire structure 100 of this invention does not have an insulating layer, and the conductive wire 102, the plurality of supporting stranded wires 104, and the protective layer 106 are all made of metal materials. Therefore, the current transmitted by the conductive wire 102 located at the core of the suspension wire structure 100 can be conducted to the plurality of supporting stranded wires 104 located at the outermost layer, and will not be shielded by the protective layer 106. In such way, even the plurality of supporting stranded wires 104 located at the outermost layer of the suspension wire structure 100 can be also electrical. When the first suspension wire structure 100 is combined with the conductive fixing base 561, the plurality of supporting stranded wires 104 located at the outermost layer of the first suspension wire structure 100 will create an electrical contact with the conductive fixing base 561. Therefore, the conductive fixing base 561 is also electrified and can transmit current to the conductive sheet 563, the wire 565, and the light-emitting module 57. In such way, at least one first light-emitting element 571 of the light-emitting module 57 can be electrically connected to the power supply module 54 via the first suspension wire structure 100.

Figure 9:
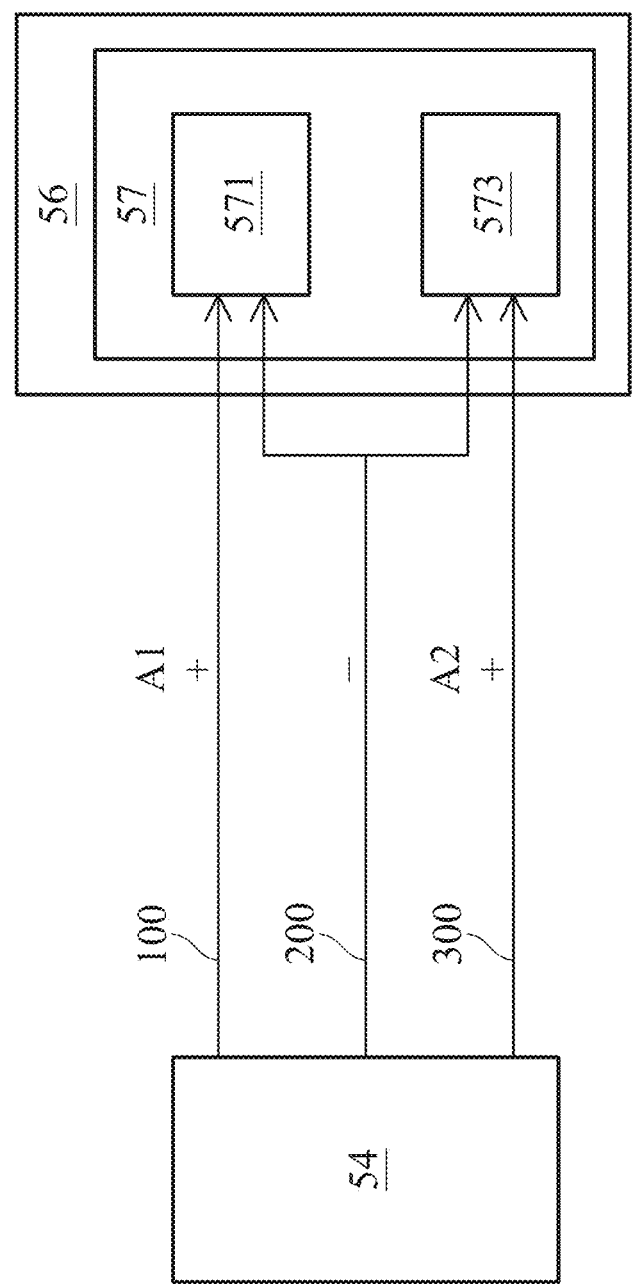
FIG. 9 is a block diagram showing a power supply module, three suspension wire structures and the lighting module in accordance with an embodiment of this invention.

Referring to FIG. 9, which is a block diagram showing a power supply module 54, three suspension wire structures and the lighting module 56 in accordance with an embodiment of this invention. In this embodiment, the light-emitting module 57 may further include at least one second light-emitting element 573. The first suspension wire structure 100 and the second suspension wire structure 200 are electrically connected to the at least one first light-emitting element 571 to form a first set of loops. The second suspension wire structure 200 and the third suspension wire structure 300 are electrically connected to at least one second light-emitting element 573 to form a second set of loops. a color temperature of the at least one first light-emitting element 571 is different from a color temperature of the at least one second light-emitting element 573. The second suspension wire structure 200 can be served as a common ground, and the power supply module 54 can provide a first current A1 via the first suspension wire structure 100. Besides, the power supply module 54 can provide a second current A2 via the third suspension wire structure 300. By controlling the first current A1 and the second current A2, the first light-emitting element 571 and the second light-emitting element 573 emit light with different intensities, so that the lighting device of this invention can be tuned to emit light with a desired color temperature.

A suspension wire structure (such as a first suspension wire structure) in the present disclosure comprises a conductive wire and a plurality of supporting stranded wires. The conductive wire can be covered by a protective layer, and the protective layer is made of oxidized materials or materials that are not easily oxidized to prevent the conductive wire from oxidation. The plurality of supporting stranded wires surround the conductive wire and abut against the periphery of the protective layer. The plurality of supporting stranded wires and the protective layer can prevent the conductive wire from being exposed to the external environment, so that the oxidation probability of the conductive wire can be further reduced.

Moreover, since the suspension wire structure can provide the functions of suspension and conductivity, a simple and aesthetical effect can be achieved in the present disclosure when comparing to a lamp (such as the lighting device 50) with the conventional conductive wire. Furthermore, the suspension wire structure does not have an insulating layer. The conductive wires, plurality of supporting stranded wires, and protective layers are all made of metal materials. The current transmitted by the conductive wire located at the core of the suspension wire structure can be conducted to the plurality of supporting stranded wires located at the outermost layer, and will not be shielded by the protective layer. Therefore, this kind of suspension wire structure is better for low-voltage condition, such as safety voltage 42V, 36V, and a person can touch the plurality of the supporting stranded wires located at the outermost layer. When applied high-voltage current in this kind of suspension wire structure, the plurality of supporting stranded wires located at the outermost layer will also have high voltage electrical properties. A person easily gets an electric shock when touching the plurality of the supporting stranded wires at the outermost layer.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope, such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of the preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A suspension wire structure, comprising:
    a conductive wire, having a first strand made of a first material;

a plurality of supporting stranded wires, surrounding the conductive wire, and each of the supporting stranded wires has a plurality of supporting strands made of a second material; and a protective layer, covering the surface of the conductive wire and being located between the conductive wire and the plurality of supporting stranded wires, wherein the plurality of supporting stranded wires and the protective layer are conductive, the protective layer is made of a third material, and the first material, the second material and the third material are different from each other, and wherein the conductive wire is electrically connected to the plurality of supporting stranded wires via the protective layer, and the plurality of supporting stranded wires are located at the outermost layer.

2. The suspension wire structure as claimed in claim 1, wherein the plurality of supporting stranded wires abut against the periphery of the protective layer.

3. The suspension wire structure as claimed in claim 2, wherein there is no gap between the protective layer and the plurality of supporting stranded wires.

4. The suspension wire structure as claimed in claim 2, wherein a conductive adhesive is included between the protective layer and the plurality of supporting stranded wires.

5. The suspension wire structure as claimed in claim 1, wherein each of the plurality supporting stranded wire further has a conductive strand, the plurality of supporting strands surround the conductive strand, and the conductive strand is made of the first material.

6. The suspension wire structure as claimed in claim 5, further includes a plurality of cores which abut against the protective layer and at least one supporting stranded wire.

7. The suspension wire structure as claimed in claim 1, further includes a plurality of supporting conductive wires which abut against the protective layer and at least one supporting stranded wire.

8. The suspension wire structure as claimed in claim 1, wherein the conductive wire further has a plurality of second strands, the plurality of second strands surround the first strand, and the plurality of second strands are made of another material different from the first material.

9. The suspension wire structure as claimed in claim 1, wherein the third material is an oxidized material.

10. A lighting device, comprising:
   a base, fixed to a ceiling;
   a lighting module, having at least one first light-emitting element;
   a power supply module, connected to an external power source and electrically connected to the lighting module; and
   at least two suspension wire structures as claimed in claim 1, forming at least one loop between the power supply module and the lighting module.

11. The lighting device as claimed in claim 10, wherein the lighting module further includes a conductive fixing base, one end of the conductive fixing base is electrically connected to the suspension wire structure, the other end of the conductive fixing base is electrically connected to a conductive sheet, and the conductive sheet is electrically connected to at least one first light-emitting element, so that at least one first light-emitting element is electrically connected to the power supply module via the suspension wire structure, wherein an electrical contact is created between the plurality of supporting stranded wires located at the outermost layer of the suspension wire structure and the conductive fixing base.

12. The lighting device as claimed in claim 10, wherein the lighting device includes three suspension wire structures and at least one second light-emitting element, the first and the second of the suspension wire structures are electrically connected to at least one first light-emitting element to form a first set of loops, the first and third of the suspension wire structures are electrically connected to at least one second light-emitting element to form a second set of loops, wherein a color temperature of the at least one first light-emitting element is different from a color temperature of the at least one second light-emitting element.

* * * * *